United States Patent
Wang et al.

(10) Patent No.: US 12,406,026 B2
(45) Date of Patent: Sep. 2, 2025

(54) ABNORMAL LOG EVENT DETECTION AND PREDICTION

(71) Applicant: International Business Machines Corporation, Armonk, NY (US)

(72) Inventors: Yi Ming Wang, Xian (CN); Hui Dong, Xian (CN); Zhong Fang Yuan, Xian (CN); Tong Liu, Xian (CN); Yan Fen Liu, Tianjin (CN); Ling Chen, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 191 days.

(21) Appl. No.: 17/363,147

(22) Filed: Jun. 30, 2021

(65) Prior Publication Data

US 2023/0004750 A1  Jan. 5, 2023

(51) Int. Cl.
*G06F 18/23213* (2023.01)
*G06F 16/18* (2019.01)
*G06F 16/9032* (2019.01)
*G06F 16/906* (2019.01)
*G06F 18/214* (2023.01)

(52) U.S. Cl.
CPC .... *G06F 18/23213* (2023.01); *G06F 16/1805* (2019.01); *G06F 16/90332* (2019.01); *G06F 16/906* (2019.01); *G06F 18/214* (2023.01)

(58) Field of Classification Search
CPC  G06K 9/6223; G06K 9/6256; G06F 16/1805; G06F 16/90332; G06F 16/906
See application file for complete search history.

(56) References Cited

U.S. PATENT DOCUMENTS

| | | | | |
|---|---|---|---|---|
| 9,306,962 | B1* | 4/2016 | Pinto | H04L 63/1416 |
| 10,083,403 | B2* | 9/2018 | Flores | G06N 3/044 |
| 10,409,789 | B2* | 9/2019 | Zoll | G06F 16/215 |
| 10,530,809 | B1* | 1/2020 | Hart | H04L 63/101 |
| 11,226,858 | B1* | 1/2022 | Srivastava | G06F 11/0778 |

(Continued)

FOREIGN PATENT DOCUMENTS

| | | | |
|---|---|---|---|
| CN | 102831020 A | 12/2012 | |
| CN | 103514398 A | 1/2014 | |

(Continued)

OTHER PUBLICATIONS

"Chapter 8: Markov Chains", The University of Auckland, New Zealand, provided by inventors in invention record Aug. 24, 2020, <: https://www.stat.auckland.ac.nz/~fewster/325/notes/ch8.pdf>, 25 pages.

(Continued)

*Primary Examiner* — Pierre Vital
*Assistant Examiner* — Zuheir A Mheir
(74) *Attorney, Agent, or Firm* — Yee & Associates, P.C.

(57) ABSTRACT

The embodiments of the present disclosure disclose a computer-implemented method, computer system and a computer program product for detecting and predicting an abnormal log event. In the method, a current event cluster from a plurality of event clusters for a log line in a log file is determined. The plurality of event clusters include at least one abnormal event cluster. Then, a time of event transition from the current event cluster to at least one abnormal event cluster is predicted.

20 Claims, 6 Drawing Sheets

(56) References Cited

U.S. PATENT DOCUMENTS

| | | | |
|---|---|---|---|
| 11,336,507 B2* | 5/2022 | Acharjee | H04L 41/0627 |
| 11,436,631 B2* | 9/2022 | Lyman | G06F 16/9536 |
| 11,477,077 B1* | 10/2022 | Berg | H04L 41/0866 |
| 2001/0019586 A1* | 9/2001 | Kang | H04N 5/145 |
| | | | 348/E5.066 |
| 2001/0051928 A1* | 12/2001 | Brody | G06F 21/16 |
| | | | 705/52 |
| 2008/0250265 A1* | 10/2008 | Chang | H04L 41/0663 |
| | | | 714/4.12 |
| 2011/0220779 A1* | 9/2011 | Takaoka | H04B 10/07955 |
| | | | 250/216 |
| 2012/0047548 A1* | 2/2012 | Rowlands | H04N 21/23805 |
| | | | 725/142 |
| 2013/0086431 A1* | 4/2013 | Arndt | G06F 11/3089 |
| | | | 714/47.1 |
| 2015/0278603 A1* | 10/2015 | Boriah | G06V 20/13 |
| | | | 382/103 |
| 2016/0019470 A1* | 1/2016 | Lightner | H04L 67/10 |
| | | | 706/12 |
| 2016/0299938 A1* | 10/2016 | Malhotra | G06F 18/2433 |
| 2017/0076217 A1* | 3/2017 | Krumm | G06N 20/00 |
| 2017/0250855 A1* | 8/2017 | Patil | H04L 41/147 |
| 2018/0285779 A1* | 10/2018 | Zhou | G06F 16/285 |
| 2019/0286747 A1* | 9/2019 | Modarresi | G06F 16/906 |
| 2019/0317961 A1* | 10/2019 | Brener | G06F 16/9035 |
| 2020/0160230 A1* | 5/2020 | Wang | G06N 5/025 |
| 2020/0219372 A1* | 7/2020 | Kwatra | G06F 16/906 |
| 2020/0349199 A1* | 11/2020 | Jayaraman | G06F 40/49 |
| 2021/0357282 A1* | 11/2021 | Verma | G06N 3/044 |
| 2021/0382746 A1* | 12/2021 | Sharma | G06F 11/3006 |
| 2021/0382770 A1* | 12/2021 | Lu | G06V 30/1988 |
| 2022/0103444 A1* | 3/2022 | Ranjan | H04L 43/106 |
| 2022/0327204 A1* | 10/2022 | Abbaszadeh | H04L 63/1425 |
| 2022/0400060 A1* | 12/2022 | Sethi | H04L 43/0817 |
| 2022/0411094 A1* | 12/2022 | Dillard | G06T 11/206 |
| 2023/0385342 A1* | 11/2023 | Berko | G06F 18/22 |

FOREIGN PATENT DOCUMENTS

| | | | | |
|---|---|---|---|---|
| CN | 109086186 A | | 12/2018 | |
| CN | 111190804 A | | 5/2020 | |
| CN | 111611218 A | * | 9/2020 | G06F 16/3331 |
| WO | 2019060327 A1 | | 3/2019 | |

OTHER PUBLICATIONS

"K-Nearest Neighbors Algorithm", Wikipedia, the Free Encyclopedia, Wikimedia Foundation, last edited on Jun. 2, 2021, downloaded from the Internet on Jun. 7, 2021, 11 pgs., <https://en.wikipedia.org/wiki/K-nearest_neighbors_algorithm>.

Kikos, et al., "Skip-Thought Vectors", Advances in Neural Information Processing Systems 28 (NIPS 2015), Dec. 7-12, 2015, 9 pgs., Montreal, Canada, Neural Information Processing Systems Foundation.

Zhang et al., "Automated IT System Failure Prediction: A Deep Learning Approach", Conference Paper—Dec. 2016, DOI: 10.1109/BigData.2016.7840733, ResearchGate, 11 pages.

Mell, et al., "The NIST Definition of Cloud Computing", Recommendations of the National Institute of Standards and Technology, National Institute of Standard and Technology, U.S. Department of Commerce, Sep. 2011, 7 pgs., Special Publication 800-145, Gaithersburg, MD, USA.

* cited by examiner

ABNORMAL LOG EVENT DETECTION AND PREDICTION

BACKGROUND

The present invention relates to detecting and predicting an abnormal log event of, for example, an internet technology (IT) system.

At present, IT systems have been used in many fields. Some online IT systems may randomly encounter system failures. If an IT system fails, it may cause serious economic losses. With the trend of increasing use of computers worldwide, increasing attention is paid to the risks caused by system failures.

SUMMARY

According to one embodiment of the present invention, there is provided a computer-implemented method. In the method, a current event cluster from a plurality of event clusters for a log line in a log file is determined. The plurality of event clusters includes at least one abnormal event cluster. Then, a time of event transition from the current event cluster to at least one abnormal event cluster is predicted.

According to another embodiment of the present invention, there is provided a computer system. The computer system includes one or more processors, a memory coupled to the one or more processors, and a set of computer program instructions stored in the memory and executed by the one or more processors to implement the method according to the one embodiment of the present invention as described above.

According to still another embodiment of the present disclosure, there is provided a computer program product. The computer program product comprises a computer readable storage medium having program instructions embodied therewith. The program instructions are executable by one or more processors to implement the method according to the one embodiment of the present disclosure as described above.

According to an aspect of the present invention, there is a method, computer program product and/or system that performs the following operations (not necessarily in the following order): (i) receiving a plurality of event clusters; (ii) receiving an indication that the plurality of event clusters includes an abnormal event cluster; (iii) determining a current event cluster for a current log line in a current log file from the plurality of event clusters; and (iv) predicting, by machine logic, a predicted time of event transition from the current event cluster to the abnormal event cluster.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
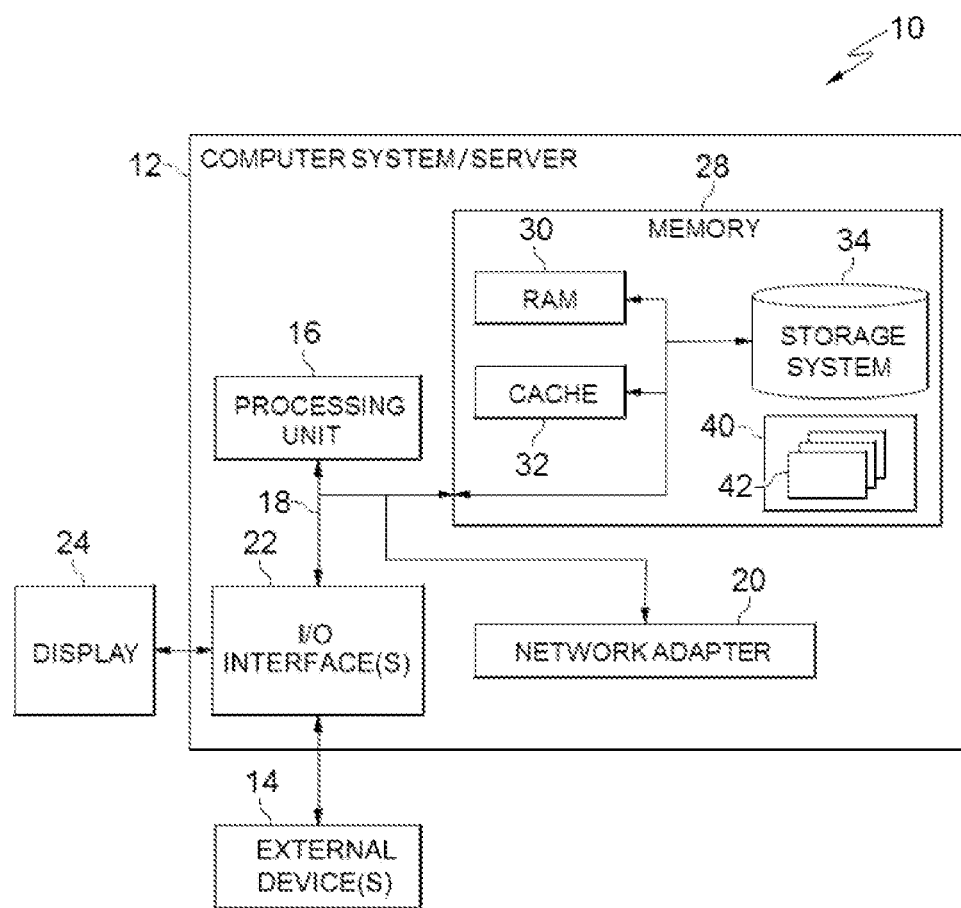
FIG. 1 depicts a cloud computing node according to an embodiment of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (for example, mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
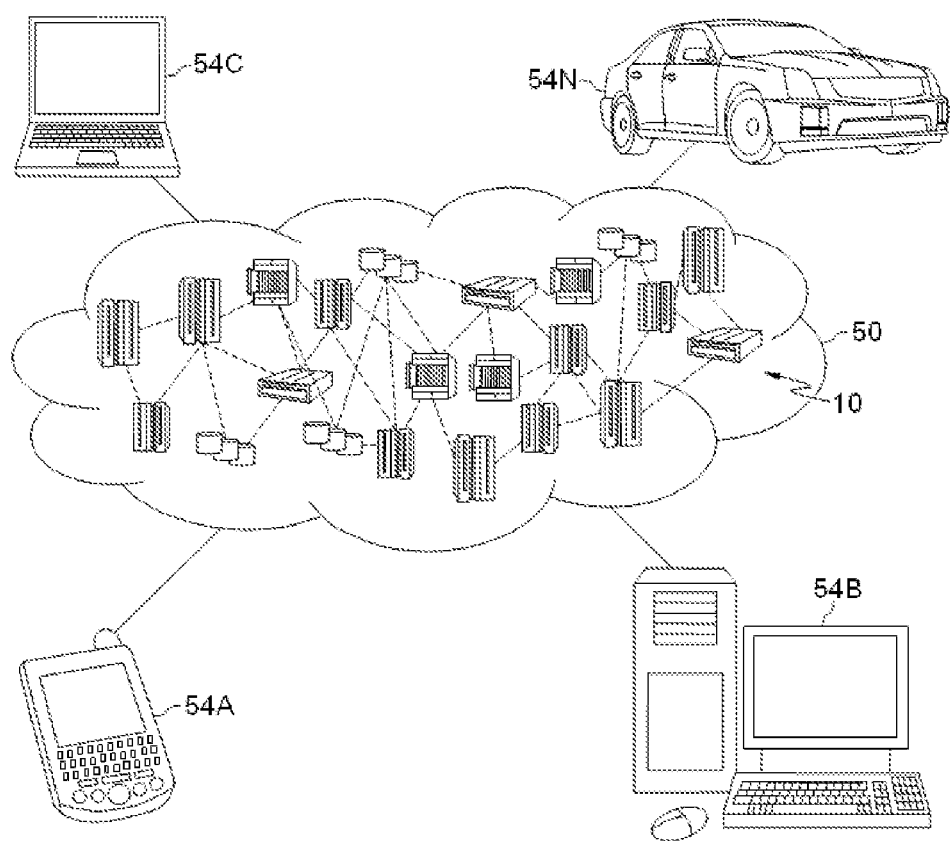
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
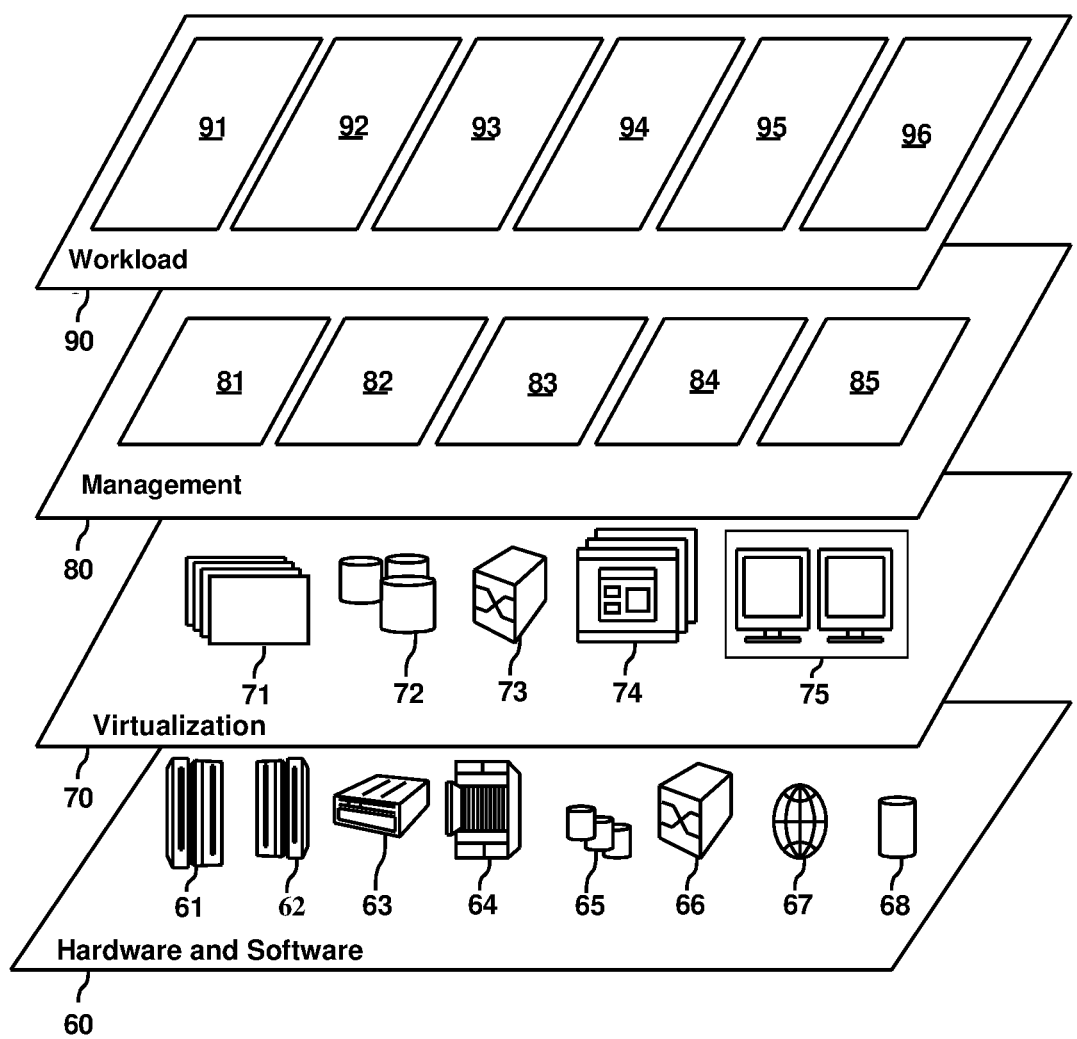
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and abnormal log event detection and prediction 96.

As mentioned above, how to effectively prevent system failures has become an important object for many enterprises. Nowadays, failure predictions are still mainly based on expert experience and traditional machine learning methods to implement expert systems, and rely heavily on manual review by experienced personnel. The process of traditional failure prediction requires quite a lot of manpower to participate in formulating rules, but the formulated rules are often difficult to directly apply to failure predictions in other IT fields dealing with other types of computer systems or different software.

Figure 4:
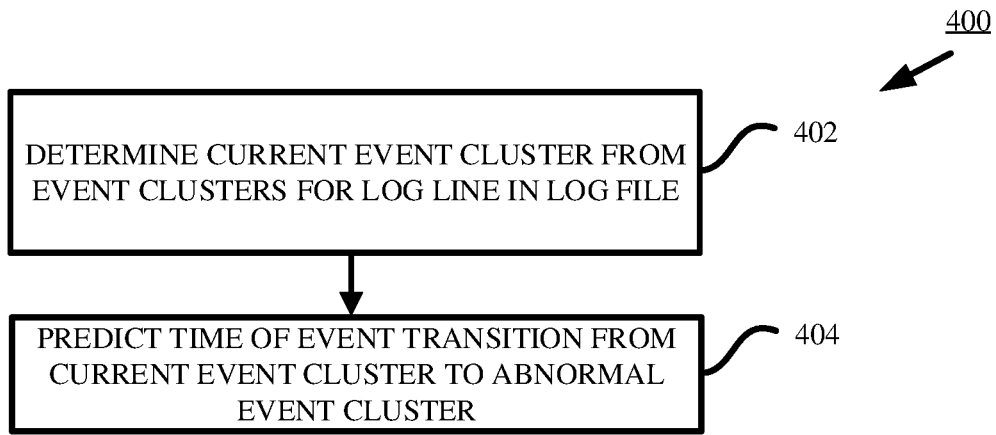
FIG. 4 depicts a schematic flowchart of the method for detecting and predicting an abnormal log event according to some embodiments of the present disclosure.

With reference to FIG. 4, a schematic flowchart of method 400, for detecting and predicting an abnormal log event according to some embodiments of the present disclosure, is shown.

In method 400 as shown in FIG. 4, at block 402, a current event cluster is determined from a plurality of event clusters for a log line in a log file. In an embodiment of the present disclosure, the log line in the log file may refer to any log line in any row of the log file. In another embodiment, the log line in the log file may refer to the newly generated log line in the log file in real time. The log line may be regarded as a log event. The log event may be assigned to one of the pluralities of event clusters based on a predetermined criterion or rule. The predetermined criterion or rule is described in detail later with reference to FIG. 5.

The assigned event cluster for the log event is referred to as the current event cluster in the context. Each of the plurality of event clusters may include one or more log events. In an embodiment, the plurality of event clusters may include at least one abnormal event cluster, which may include one or more abnormal log events. If the current event cluster is determined as the abnormal event cluster, it is determined that an abnormal log event is detected.

In an example, the plurality of event clusters may include the following event clusters, such as, CPU normal, CPU abnormal, memory normal, memory abnormal, disk normal, disk abnormal, and other event clusters. CPU abnormal, memory abnormal, and disk abnormal event clusters are examples of the abnormal event clusters. It is noted that the plurality of event clusters may include other number or kind of event clusters.

Figure 5:
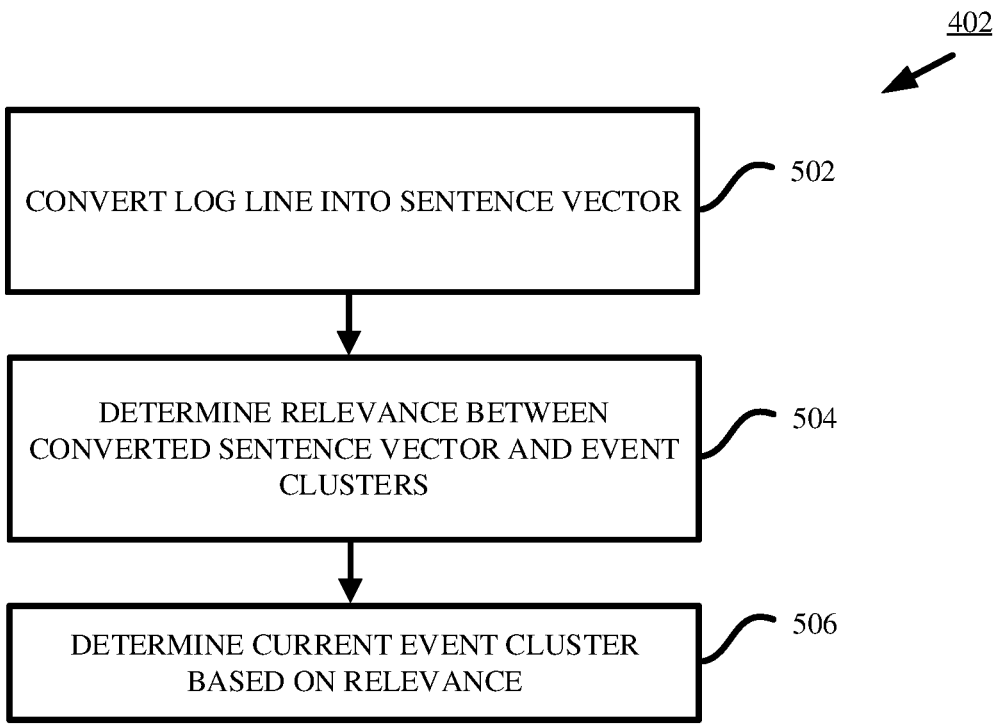
FIG. 5 depicts a schematic flowchart for illustrating an example process of determining a current event cluster from a plurality of event clusters for a log line in a log file in the method depicted by FIG. 4.

An example process of determining the current event cluster from the plurality of event clusters for the log line in the log file is now described below with reference to FIG. 5.

At block 502, the log line is converted into a sentence vector. In an example, the log line may be converted into the sentence vector based on a sentence2vec model. The sentence2vec model may be a skip-thoughts model. Those of ordinary skill in the art will appreciate that the details about the skip-thoughts model are known in currently conventional technology. According to the above document, the skip-thoughts model includes an encoder, which maps words to a sentence vector. Generally, the skip-thoughts model is used for processing natural language, but the inventors of the present application creatively find that it is also suitable for processing log files.

The sentence2vec model may be trained by a training method in advance. An example process of the training method 600 according to some embodiments of the present disclosure is shown in FIG. 6.

Figure 6:
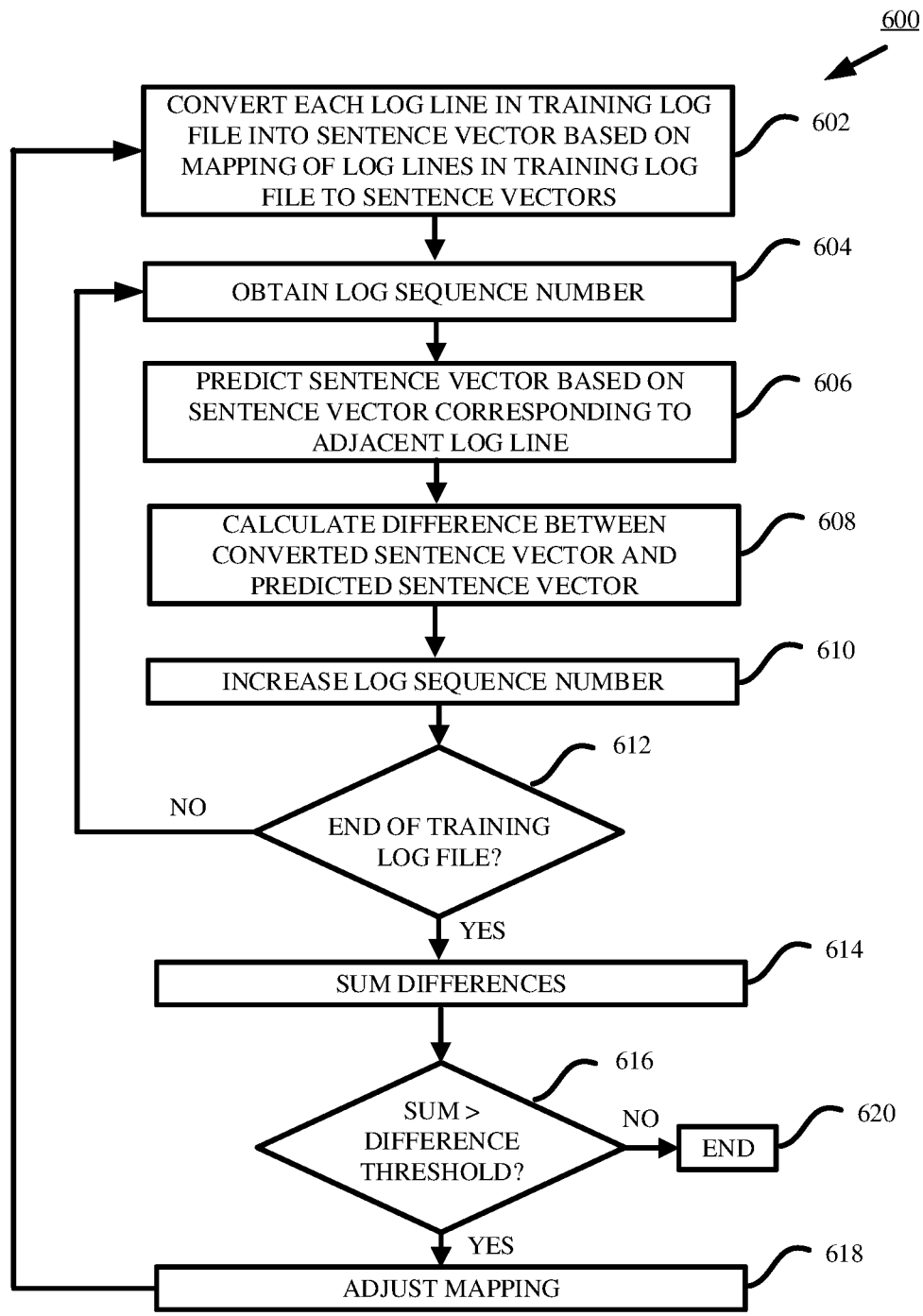
FIG. 6 depicts a schematic flowchart for illustrating an example process of training a sentence2vec model according to some embodiments of the present disclosure.

In training method 600 as shown in FIG. 6, at block 602, each log line in a training log file is converted into a sentence vector based on a mapping of the log lines in the training log file to sentence vectors. In the first iteration of the training process, the mapping may be an initial mapping based on experience data, for example.

Then the operations at blocks 604-612 are performed on each log line in the training log file in sequence.

At block 604, a log sequence number (LSN) M is obtained, which indicates the row number of the log line in the training log file to be processed currently. In an example, M may denote any integer number less than the number N of rows of the training log file. In another example, M may denote any integer number less than or equal to N. In this case, a dummy log line may be added to the end of the training log file. Therefore, the training log file may appear like having (N+1) log lines.

Then, at block 606, a sentence vector is predicted based on at least one sentence vector corresponding to at least one log line adjacent to the log line. For example, the sentence vector corresponding to the Mth log line may be predicted based on the sentence vector corresponding to the (M−1)th log line and the sentence vector corresponding to the (M+1)th log line. Those of ordinary skill in the art will appreciate that in an embodiment, the sentence vector may be predicted by using the aforementioned skip-thoughts model.

Next, at block 608, a difference between the converted sentence vector corresponding to the log line and the predicted sentence vector is calculated. In an example, the difference may be calculated as a distance from the converted sentence vector to the predicted sentence vector in a vector space of the sentence2vec model. The difference may be expected to be as small as possible, because it means the log line is well matched to the converted sentence vector.

At block 610, the LSN is increased. Generally, the LSN may be increased by, for example, 1. As mentioned above, a dummy log line may be added to the training log file. If the dummy log line is added, then the maximum value of the LSN is (N+1). Alternatively, if the dummy log line is not added, then the maximum value of the LSN is N.

At block 612, it is determined whether the end of the training log file is reached. In an example, whether the end of the training log file is reached depends on whether the LSN reaches its maximum value. If the LSN reaches its maximum value, then the end of the training log file is reached. In the case of having the dummy log line, if the LSN=(N+1), the end of the training log file is reached. In the case of having no dummy log line, if the LSN=N, the end of the training log file is reached.

If the end of the training log file is not reached ("NO" at block 612), then the training process goes back to block 604 to process the next log line. If the end of the training log file is reached ("YES" at block 612), then the calculated differences for the respective log lines in the training log file is summed up together at block 614.

At block 616, it is determined whether the summed differences are higher than a difference threshold. If the summed differences are higher than the difference threshold ("YES" at block 616), then the mapping of the log lines in the training log file to sentence vectors is adjusted at block 618 and the training process goes back to block 602 to start the next iteration.

If the summed differences are lower than or equal to the difference threshold ("NO" at block 616), then the training process ends at block 620. It means the log lines are well matched to the converted sentence vectors, and the mapping is good enough.

In this way, the context information of the training log files is utilized to adjust the accuracy of the mapping.

Turning back to FIG. 5, after converting the log line into the sentence vector at block 502, relevance between the converted sentence vector and the plurality of event clusters is determined at block 504. Next, at block 506, the current event cluster is determined based on the relevance between the converted sentence vector and the plurality of event clusters.

In an example, the operations at blocks 504 and 506 may be performed based on a K-Nearest Neighbor (KNN) algorithm. As known by those skilled in the art, the KNN algorithm is widely used for classification. The input of the KNN model consists of the K closest training examples in data set. The output of the KNN model is a class membership. An object is classified by a plurality vote of its neighbors, with the object being assigned to the class most common among its K nearest neighbors. Here, K is a positive integer.

Through the process described above with reference to FIG. 5, the current event cluster is determined for the log line.

Turning back to FIG. 4, at block 404, a time of event transition from the current event cluster to at least one abnormal event cluster is predicted. The time of event transition from the current event cluster to at least one abnormal event cluster may be used to alert at what time an abnormal log event would happen.

Figure 7:
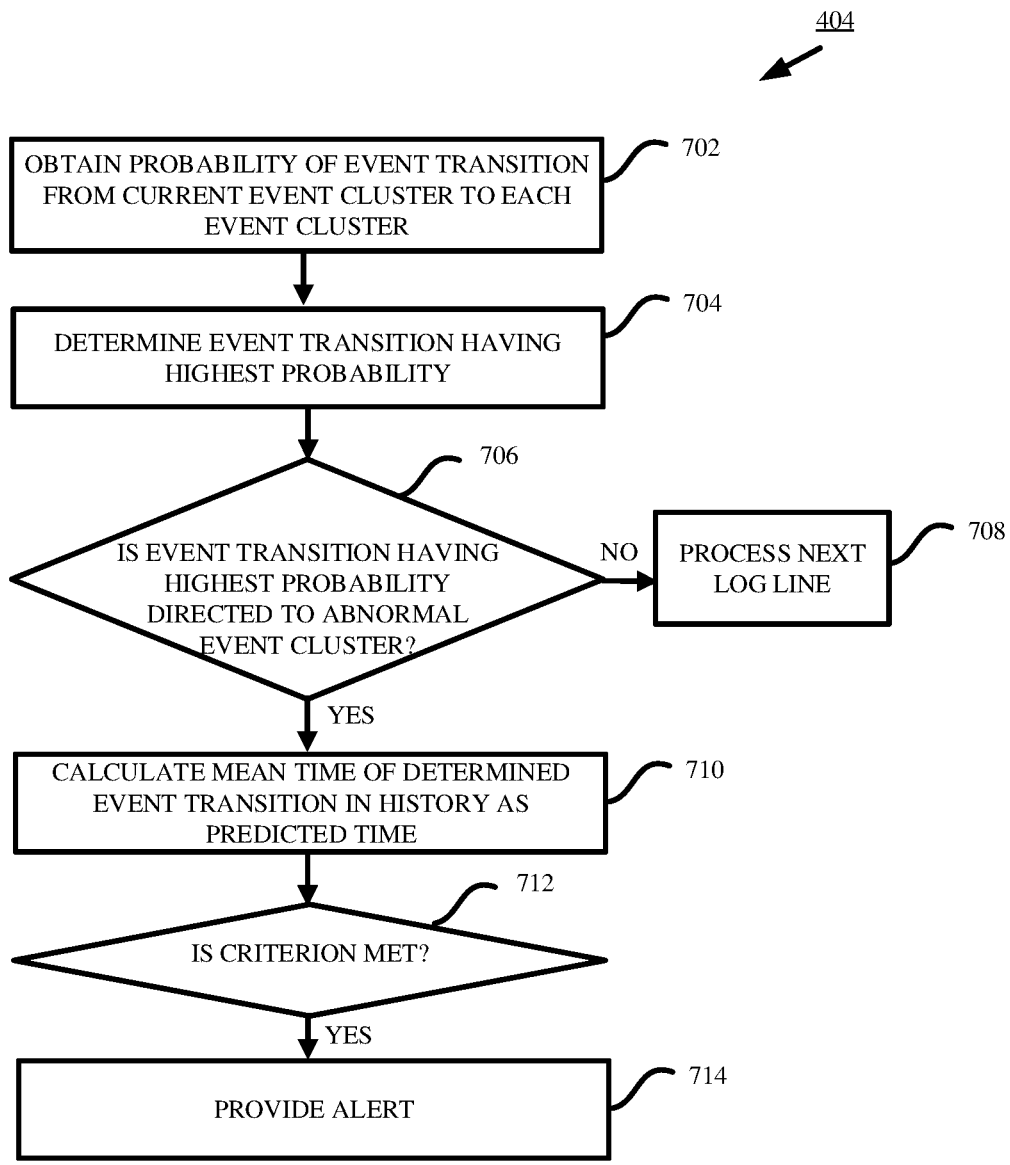
FIG. 7 depicts a schematic flowchart for illustrating an example process of predicting a time of event transition from the current event cluster to at least one abnormal event cluster in the method depicted by FIG. 4.

FIG. 7 shows a schematic flowchart for illustrating an example process of predicting the time of event transition from the current event cluster to at least one abnormal event cluster.

At block 702, a probability of an event transition from the current event cluster to each of the plurality of event clusters is obtained. In the example where the plurality of event clusters include seven event clusters, these seven event clusters may be denoted as E1-E7 respectively. The probabilities of the respective event transitions may be illustrated by the following probability matrix. For example, as shown in the probability matrix, the probability of the event transition from E2 to E1 may be f, the probability of the event transition from E3 to E2 may be c, and the probability of the event transition from E7 to E5 may be r.

$$\begin{array}{c} \phantom{E1}\,E1\;E2\;E3\;E4\;E5\;E6\;E7 \\ \begin{array}{c} E1 \\ E2 \\ E3 \\ E4 \\ E5 \\ E6 \\ E7 \end{array} \begin{pmatrix} 0 & p & q & 0 & 0 & 0 & 0 \\ f & 0 & y & 0 & b & 0 & 0 \\ 0 & c & 0 & e & 0 & 0 & 0 \\ 0 & g & 0 & 0 & h & 0 & 0 \\ 0 & a & e & 0 & 0 & 0 & 0 \\ 0 & 0 & 0 & 0 & 0 & 1 & 0 \\ u & 0 & w & 0 & r & 0 & 0 \end{pmatrix} \end{array}$$

In an example, the above probability matrix may be obtained based on the statistical probability of the event transition in history. For example, in the operation history of the IT system, f event cluster E2 transit to event cluster E1, y event cluster E2 transit to event cluster E3, and b event cluster E2 transit to event cluster E5, where f+y+b=1. Therefore, in the probability matrix, the probability of the event transition from E2 to E1 is f, the probability of the event transition from E2 to E3 is y, and the probability of the event transition from E2 to E5 is b. In an example, f may be 25%, y may be 40%, and b may be 35%.

In a further example, the above probability matrix may be obtained further based on experience value. For instance, from the experience of an expert, the probability of the event transition from E2 to E3 may not exceed an upper limit value TH (30% for example), which is lower than y, and thus the probability of the event transition from E2 to E3 is reduced to TH. Therefore, the probability matrix should be amended as below.

$$\begin{array}{c} \phantom{E1}\,E1\;E2\;E3\;E4\;E5\;E6\;E7 \\ \begin{array}{c} E1 \\ E2 \\ E3 \\ E4 \\ E5 \\ E6 \\ E7 \end{array} \begin{pmatrix} 0 & p & q & 0 & 0 & 0 & 0 \\ f & 0 & TH & 0 & b & 0 & 0 \\ 0 & c & 0 & e & 0 & 0 & 0 \\ 0 & g & 0 & 0 & h & 0 & 0 \\ 0 & a & e & 0 & 0 & 0 & 0 \\ 0 & 0 & 0 & 0 & 0 & 1 & 0 \\ u & 0 & w & 0 & r & 0 & 0 \end{pmatrix} \end{array}$$

Next, at block 704, an event transition having the highest probability is determined. In the above example where the current event cluster is E2, the probability of the event transition from E2 to E1 is f, the probability of the event transition from E2 to E3 is y, and the probability of the event transition from E2 to E5 is b, given b>TH>f, the event transition having the highest probability is the event transition from E2 to E5.

Then, it is determined whether the event transition having the highest probability is directed to the abnormal event cluster at block 706. In the above example where the event transition having the highest probability is the event transition from E2 to E5, it is determined whether E5 is the abnormal event cluster.

If the event transition having the highest probability is not directed to the abnormal event cluster ("NO" at block 706), the next log line is processed at block 708, where the next log line is obtained, and the process goes back to block 402 in FIG. 4.

In an embodiment, a Markov Chain model may be used to assist the calculation of the probability matrix. Those of ordinary skill in the art will appreciate that the Markov Chain model is known in the prior art. In the Markov Chain model, the probability matrix may be represented by P=(p_ij). The rows of the probability matrix X_t represent the state at time t (for example, the current event cluster), and the columns of the probability matrix X_t+1 represent the state at time t+1 (for example, the next event cluster). p_ij=P(X_t+1=j|X_t=i). In the Markov Chain model, the future depends only upon the present, not the past. Therefore, P(X_t+1=s|X_t=s_t, X_t−1=s_t−1, . . . , X_0=s_0)=P(X_t+1=s|X_t=s_t), for all t=1, 2, 3, . . . and for all states s_0, . . . , s_t−1, s_t, s. P(X_n=j|X_0=i)=(Pn)_ij for any n, where X_t+n represent the state at time t+n. In this way, the probability matrix for any later transitions (for the subsequent log lines) can be calculated accordingly.

If the event transition having the highest probability is directed to the abnormal event cluster ("YES" at block 706), a mean time of the event transition having the highest probability in history is calculated as the predicted time at block 710. In the above example, the event transition having the highest probability is from E2 to E5. In an embodiment, the mean time may be calculated based on the Markov Chain model. In the Markov Chain model, miA=E(TA|X_0=i), where TA represent the hitting time of A, i=E2 and A=E5 in this example, and miA can be calculated by the following formula.

$$m_{iA} = \begin{cases} 0 & \text{for } i \in A, \\ 1 + \sum_{j \notin A} p_{ij} m_{jA} & \text{for } i \notin A. \end{cases}$$

In an embodiment, it is determined whether a criterion for providing an alert is met at block 712. In an example, the criterion may be the predicted time being lower than a time threshold value. If the abnormal log event is going to take place after a long time (after two days for example), the daily operations of the user of the IT system may introduce other influence factors to reduce the probability of event transition to the abnormal event cluster. Therefore, this issue may be ignored.

In an alternative example, the criterion may be the highest probability being higher than a probability threshold and the predicted time being lower than the time threshold. Here, in addition to the predicted time, the probability of event transition to the abnormal event cluster is also taken into account. If the probability of event transition to the abnormal event cluster is low (2% for example), this event transition may probably not happen. Therefore, this issue may be ignored.

If the criterion is met ("YES" at block 712), the alert is provided at block 714. In the example where the criterion is the predicted time being lower than a time threshold, the predicted time may be provided in the alert. In the example where the criterion is the highest probability being higher than a probability threshold and the predicted time being lower than the time threshold, the highest probability and the predicted time may be provided in the alert.

The embodiments of the present disclosure are able to detect and predict abnormal log events automatically, such that the user of the IT system can be notified of system failures in advance. Further, the embodiments of the present disclosure improve the efficiency of failure prediction and save manpower and material resources in the IT operation and maintenance process.

It should be noted that the processing of abnormal log event detection and prediction according to embodiments of this disclosure could be implemented by computer system/server 12 of FIG. 1.

Under the same inventive concept, another embodiment of the present invention can provide a computer system for detecting and predicting an abnormal log event. The computer system may comprise one or more processors, a memory coupled to at least one of the processors, and a set of computer program instructions stored in the memory. The set of computer program instructions are executed by at least one of the processors to determine a current event cluster from a plurality of event clusters for a log line in a log file, the plurality of event clusters comprising at least one abnormal event cluster; and predict a time of event transition from the current event cluster to at least one abnormal event cluster.

Similarly, under the same inventive concept, another embodiment of the present invention can provide a computer program product for detecting and predicting an abnormal log event. The computer program product comprises a computer readable storage medium having program instructions embodied therewith. The program instructions are executable by a processor to determine a current event cluster from a plurality of event clusters for a log line in a log file, the plurality of event clusters comprising at least one abnormal event cluster; and predict a time of event transition from the current event cluster to at least one abnormal event cluster.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    receiving a current log line of a log file indicative of a current log event reflecting a portion of processing performed by one or more computer(s) in an information technology (IT) system;
    categorizing the current log event as belonging to a first event cluster of a plurality of event clusters with the first event cluster being a central processing unit (CPU) normal type cluster;
        determining a probability value that the first event cluster will be followed by event(s) from a second event cluster of the plurality of event clusters, with the second event cluster being a CPU abnormal type cluster;
        responsive to determining the probability value that the first event cluster will be followed by the event(s) from the second event cluster, determining that the probability value exceeds a first threshold;
        responsive to determining that the probability value exceeds the first threshold, predicting, by machine logic, a predicted time of event transition from a time of the current log event until event(s) of the second event cluster are likely to occur;
    responsive to predicting the predicted time of the event transition, determining that the predicted time of the event transition from the time of the current log event until event(s) of the second event cluster are likely to occur is below a second threshold; and
    responsive to the determination that the probability value that the first event cluster will be followed by the event(s) from the second event cluster exceeds the first threshold and further responsive to the determination that the predicted time of the event transition is below the second threshold, communicating a warning that abnormal CPU operations are likely to occur so that countermeasures can be taken so that the CPU remains operational, wherein predicting the predicted time of the event transition comprises:
        obtaining, by one or more processors, a probability of the event transition from the current event cluster to each of the plurality of event clusters to form a plurality of obtained event transitions;
        determining, by the one or more processors, an obtained event transition having a highest probability from the plurality of obtained event transitions; and
        in response to the obtained event transition having the highest probability being directed to at least one abnormal event cluster, calculating, by the one or more processors, a mean time of the obtained event transition having the highest probability in an operational history of the IT system as the predicted time.

2. The computer-implemented method of claim 1, further comprising:
    converting the current log line to a sentence vector:
    determining relevance between the sentence vector and the plurality of event clusters; and
    determining the current event cluster based on the relevance between the sentence vector and the plurality of event clusters.

3. The computer-implemented method of claim 2, wherein the first event cluster is determined based on relevance between the sentence vector and the plurality of event clusters.

4. The computer-implemented method of claim 1, wherein the warning comprises the probability value and the predicted time.

5. The computer-implemented method of claim 1, further comprising:
    in response to the obtained event transition having the highest probability not being directed to the at least one abnormal event cluster;
    determining, by the one or more processors, a next event cluster from the plurality of event clusters for a next log line in the log file; and
    predicting, by the one or more processors, a time of event transition from the next event cluster to the at least one abnormal event cluster.

6. The computer-implemented method of claim 1, wherein the plurality of event clusters comprises CPU normal, CPU abnormal, memory normal, memory abnormal, disk normal, and disk abnormal.

7. A computer program product comprising program code executable by a processor to perform steps of:
    receiving a current log line of a log file indicative of a current log event reflecting a portion of processing performed by one or more computer(s) in an information technology (IT) system;
    categorizing the current log event as belonging to a first event cluster of a plurality of event clusters with the first event cluster being a disk normal type cluster;
        determining a probability value that the first event cluster will be followed by event(s) from a second event cluster of the plurality of event clusters, with the second event cluster being a disk abnormal type cluster;
        responsive to determining the probability value that the first event cluster will be followed by the event(s)

from the second event cluster, determining that the probability value exceeds a first threshold;
responsive to determining that the probability value exceeds the first threshold, predicting, by machine logic, a predicted time of event transition from a time of the current log event until event(s) of the second event cluster are likely to occur;
responsive to predicting the predicted time of the event transition, determining that the predicted time of the event transition from the time of the current log event until event(s) of the second event cluster are likely to occur is below a second threshold; and
responsive to the determination that the probability value that the first event cluster will be followed by the event(s) from the second event cluster exceeds the first threshold and further responsive to the determination that the predicted time of the event transition is below the second threshold, communicating a warning that abnormal disk operations are likely to occur so that countermeasures can be taken so that the disk remains operational, wherein predicting the predicted time of the event transition comprises:
obtaining, by one or more processors, a probability of the event transition from the current event cluster to each of the plurality of event clusters to form a plurality of obtained event transitions;
determining, by the one or more processors, an obtained event transition having a highest probability from the plurality of obtained event transitions; and
in response to the obtained event transition having the highest probability being directed to at least one abnormal event cluster, calculating, by the one or more processors, a mean time of the obtained event transition having the highest probability in an operational history of the IT system as the predicted time.

8. The computer program product of claim 7, further comprising:
converting the current log line to a sentence vector:
determining relevance between the sentence vector and the plurality of event clusters; and
determining the current event cluster based on the relevance between the sentence vector and the plurality of event clusters.

9. The computer program product of claim 8, wherein the first event cluster is determined based on relevance between the sentence vector and the plurality of event clusters.

10. The computer program product of claim 7, wherein the warning comprises the probability value and the predicted time.

11. The computer program product of claim 7, further comprising:
in response to the obtained event transition having the highest probability not being directed to the at least one abnormal event cluster;
determining, by the one or more processors, a next event cluster from the plurality of event clusters for a next log line in the log file; and
predicting, by the one or more processors, a time of event transition from the next event cluster to the at least one abnormal event cluster.

12. The computer program product of claim 7, wherein the plurality of event clusters comprises CPU normal, CPU abnormal, memory normal, memory abnormal, disk normal, and disk abnormal.

13. The computer program product of claim 7, where each event cluster of the plurality of event clusters includes one or more log events.

14. A computer system comprising:
a processor coupled to a memory including instructions executable by the processor to perform steps of:
receiving a current log line of a log file indicative of a current log event reflecting a portion of processing performed by one or more computer(s) in an information technology (IT) system;
categorizing the current log event as belonging to a first event cluster of a plurality of event clusters with the first event cluster being a memory normal type cluster;
determining a probability value that the first event cluster will be followed by event(s) from a second event cluster of the plurality of event clusters, with the second event cluster being a memory abnormal type cluster;
responsive to determining the probability value that the first event cluster will be followed by the event(s) from the second event cluster, determining that the probability value exceeds a first threshold;
responsive to determining that the probability value exceeds the first threshold, predicting, by machine logic, a predicted time of event transition from a time of the current log event until event(s) of the second event cluster are likely to occur;
responsive to predicting the predicted time of the event transition, determining that the predicted time of the event transition from the time of the current log event until event(s) of the second event cluster are likely to occur is below a second threshold; and
responsive to the determination that the probability value that the first event cluster will be followed by the event(s) from the second event cluster exceeds the first threshold and further responsive to the determination that the predicted time of the event transition is below the second threshold, communicating a warning that abnormal memory operations are likely to occur so that countermeasures can be taken so that the memory remains operational, wherein predicting the predicted time of the event transition comprises:
obtaining, by one or more processors, a probability of the event transition from the current event cluster to each of the plurality of event clusters to form a plurality of obtained event transitions;
determining, by the one or more processors, an obtained event transition having a highest probability from the plurality of obtained event transitions; and
in response to the obtained event transition having the highest probability being directed to at least one abnormal event cluster, calculating, by the one or more processors, a mean time of the obtained event transition having the highest probability in an operational history of the IT system as the predicted time.

15. The computer system of claim 14, further comprising:
converting the current log line to a sentence vector:
determining relevance between the sentence vector and the plurality of event clusters; and
determining the current event cluster based on the relevance between the sentence vector and the plurality of event clusters.

16. The computer system of claim 15, wherein the first event cluster is determined based on relevance between the sentence vector and the plurality of event clusters.

17. The computer system of claim 14, wherein the warning comprises the probability value and the predicted time.

18. The computer system of claim 14, further comprising:

in response to the obtained event transition having the highest probability not being directed to the at least one abnormal event cluster;

determining, by the one or more processors, a next event cluster from the plurality of event clusters for a next log line in the log file; and predicting, by the one or more processors, a time of event transition from the next event cluster to the at least one abnormal event cluster.

19. The computer system of claim 14, wherein the plurality of event clusters comprises CPU normal, CPU abnormal, memory normal, memory abnormal, disk normal, and disk abnormal.

20. The computer system of claim 14, where each event cluster of the plurality of event clusters includes one or more log events.

* * * * *